United States Patent

Kawaguchi et al.

[11] Patent Number: 5,829,883
[45] Date of Patent: Nov. 3, 1998

[54] ROLLING MOTION GUIDE APPARATUS

[75] Inventors: Takahiro Kawaguchi, Tokyo; Tadashi Hirokawa, Moroyama-machi, both of Japan

[73] Assignee: THK Co., Ltd., Tokyo, Japan

[21] Appl. No.: 947,159

[22] Filed: Oct. 8, 1997

[30]     Foreign Application Priority Data

Oct. 9, 1996   [JP]   Japan ................................... 8-287544

[51] Int. Cl.$^6$ .................................................. F16C 29/06
[52] U.S. Cl. ............................................... 384/45; 384/43
[58] Field of Search ................................ 384/43, 44, 45, 384/13

[56]             References Cited

U.S. PATENT DOCUMENTS

4,545,626  10/1985  McCloskey ............................... 384/43
  4,934,834   6/1990  Morita ................................... 384/43 X
  5,051,001   9/1991  Jacob ..................................... 384/43
  5,139,347   8/1992  Hattori ................................. 384/45 X

*Primary Examiner*—Thomas R. Hannon
*Attorney, Agent, or Firm*—Armstrong, Westerman, Hattori, McLeland & Naughton

[57]                ABSTRACT

A rolling motion guide apparatus comprises a guide rail formed with a loaded rolling member rolling passage and a movable member disposed to be movable with respect to the guide rail through a number of rolling members, in which the rolling direction changing passage structure is composed of an end surface forming portion which is formed with a rolling direction changing passage inner periphery guide portion integrally formed with the movable member main body and an end plate which is formed with a rolling direction changing passage outer periphery guide portion separately formed from the end surface forming portion. The rolling direction changing passage outer periphery guide portion of the end plate and a rolling direction changing passage inner periphery guide portion thereof have peripheral portions respectively which are joined and welded so as to provide joining surfaces as a welding portion.

10 Claims, 3 Drawing Sheets

ROLLING MOTION GUIDE APPARATUS

BACKGROUND OF THE INVENTION

The present invention relates to a rolling motion guide apparatus, particularly having a rolling direction changing passage structure, adapted for such as linear motion guide apparatus, ball spline, ball bush, ball screw and the like, in which a movable member is assembled to a guide shaft to be movable through rolling members.

In a known art, there is provided a rolling motion guide apparatus of the kind mentioned above in which a movable member is assembled to a guide shaft to be movable through a plurality of rolling members. The movable member is composed of a movable member main body provided with a loaded rolling member rolling passage corresponding in position to a loaded rolling member rolling passage formed to the guide shaft and a rolling member returning passage for returning the rolling members from one end of the loaded rolling member rolling passage to another end thereof and also composed of a structure constituting a rolling direction changing passage disposed at both ends of the main body of the movable member and constituting rolling member rolling direction changing passages for scooping the rolling members from the loaded rolling member rolling passage and guiding the same to the rolling member returning passage.

In order to prevent a staged portion from occurring at the connection between the loaded rolling member rolling passage and the rolling member rolling direction changing passage to thereby smoothly roll the rolling members, in the known art, an inner peripheral guide portion of the rolling member direction changing passage is formed integrally with the main body of the movable member such as disclosed in the Japanese Patent Laid-open Publication No. HEI 7-317762.

Although there is provided an end plate, generally formed of resin, as a member constituting the rolling direction changing passage structure for constituting an outer periphery guide portion of the loaded rolling member rolling direction changing passage (herein called merely rolling direction changing passage), the end plate is formed of a different member from the main body of the movable member, and the end plate is positioned and then fastened to the movable member main body by means of bolt. The rolling direction changing passage is composed of such outer periphery guide portion of the end plate and the inner periphery portion integrally formed with the movable member main body.

In the above known structure, there is a problem of fastening the end plate to the movable member main body by means of bolt, involving a troublesome assembling working.

In the case of the bolt fastening, the fastening bolt is screwed into a tap hole formed to an end surface of the movable member main body through a bolt insertion hole formed to the end plate. However, in this assembling, there may cause an alignment error to the end plate assembling portion due to a working error in the tap hole formation or a play between the bolt insertion hole and the bolt inserted. The occurrence of such error will result in the formation of the staged portion between the direction changing passage outer periphery guide portion of the end plate and the end portion of the rolling member rolling passage in a loaded area, disturbing the smooth circulation of the rolling members.

Furthermore, even if such assembling working can be made accurately, the end plate formed of the resin material has contraction strain of the resin at the cooling and curing time of the end plate. Such contraction strain may cause the staged portion to occur between the end portion inside the direction changing passage outer periphery guide portion and the end portion of the rolling member rolling passage in the loaded area, thus also disturbing the smooth circulation of the rolling members.

Still furthermore, in a known structure, an oil groove for feeding a lubricant to the direction changing passage is formed between joining surfaces of the end plate and the movable member main body so as to tightly contact the joining surfaces by means of the fastening bolt to prevent the lubricant from leaking through the joined surface. However, as mentioned above, since the end plate has the contraction strain at the cooling time, the end plate cannot tightly contact the movable member main body and there is a fear of the leakage of the lubricant through the not-tightly contacting portion. Although the complete tight contacting can be achieved by strongly fastening the bolt, such strong fastening may damage or deform the end plate, resulting in the deformation of the direction changing passage outer periphery guide portion and further resulting in the deformation of the end position of the direction changing passage outer peripheral guide portion, causing the staged portion between it and the end portion of the loaded rolling member rolling passage and, hence, disturbing the smooth circulation of the rolling members.

SUMMARY OF THE INVENTION

An object of the present invention is to substantially eliminate defects or drawbacks encountered in the prior art described above and to provide a rolling motion guide apparatus having an improved mounting structure of an end plate of a movable member of the apparatus particularly for ensuring a stable and smooth circulation of rolling members with high reduced working process and with high assembling performance.

This and other objects can be achieved according to the present invention by providing a rolling motion guide apparatus which comprises a guide shaft formed with a loaded rolling member rolling passage and a movable member disposed to be movable with respect to the guide shaft through a number of rolling members, the movable member being composed of a movable member main body provided with a loaded rolling member rolling passage corresponding in position to the loaded rolling member rolling passage formed to the guide shaft and a rolling member returning passage for returning the rolling members from one end of the loaded rolling member rolling passage of the movable member main body to another end thereof and also composed of a rolling direction changing passage structure constituting a rolling member direction changing passage for guiding the rolling member scooped from the loaded rolling member rolling passage of the movable member main body to the rolling member returning passage, wherein the rolling direction changing passage structure is composed of an end surface forming portion which is formed with a rolling direction changing passage inner periphery guide portion integrally formed with the movable member main body and an end plate which is formed with a rolling direction changing passage outer periphery guide portion separately formed from the end surface forming portion, and wherein the rolling direction changing passage outer periphery guide portion of the end plate and a rolling direction changing passage inner periphery guide portion thereof have peripheral portions respectively which are joined and welded so as to provide joining surfaces as a welding portion.

In preferred examples of the present invention, the end surface forming portion of the movable member main body is formed of a resin material through an insertion molding process.

The guide shaft is a guide rail and the movable member is composed of a central horizontal portion and side portions extending downward in a mounted state from both end portions of the horizontal portion so that the guide rail is disposed between the side portions of the movable member.

The movable member main body is provided with axial forming portions which are integrally formed with the end surface forming portions formed at both ends of the movable member main body. Each of the axial forming portions is provided with at least either one of a return hole constituting member forming a non-loaded rolling member returning hole and a rolling member retainer member for preventing the rolling member from falling down at a time when the guide shaft is withdrawn from the movable member.

The rolling direction changing passage outer periphery guide portion and the rolling direction changing passage inner periphery guide portion of the rolling direction changing passage structure have peripheral portions respectively which are joined so as to provide joining surfaces, and a welding portion is continuously formed between the joining surfaces.

A lubricant groove is formed between the joining surfaces of the end surface forming portion and the end plate to communicate with the rolling direction changing passage structure and the welding portion is formed continuously so as to surround the rolling direction changing passage structure and the lubricant groove.

A recessed portion and a protruded portion, which is faucet fitted to the recessed portion, are formed to the peripheral portions of the rolling direction changing passage inner periphery guide portion of the end surface forming portion of the movable member main body and the rolling direction changing passage outer periphery guide portion of the end plate, the protruded and recessed portions having flat portions as joining surfaces to be joined together, and a welding width portion, which is fused at a welding time, is formed between the joining surfaces.

A projection is formed to the joining surface of the end surface forming portion of the movable member main body and the end plate is formed with a hole at the joining surface thereof through which the projection is inserted, and a front end portion of the projection penetrating over the hole is fused to a peripheral edge portion of the hole.

According to the characters and structures of the rolling motion guide apparatus of the present invention mentioned above, the following functions and/or effects will be attained.

The direction changing passage inner periphery guide portion of the end surface forming portion integrally formed with the end surface of the movable member main body through the insertion molding process is accurately formed to the predetermined position of the movable member main body with the predetermined shape. In the formation mold, the movable member main body is positioned by a support portion contacting the rolling member rolling passage, and the direction changing passage inner periphery guide portions can be accurately positioned with reference to the rolling member rolling passage and, after the positioning, the molding process is carried out.

The peripheral portions of the direction changing passage inner periphery guide portion and the direction changing passage outer periphery guide portion of the end plate and the movable member main body are fused and welded. Accordingly, even if the end plate is deformed, the rolling direction changing passage outer periphery guide portion is fixed with the corrected deformation along the rolling direction changing passage inner periphery guide portion of the end surface forming portion of the movable member main body molded with high performance, thereby forming the passage constituting the rolling direction changing passage with high accuracy. That is, in the rolling direction changing passage, the respective rolling members are changed in their rolling directions with pushing force being applied to each other and the rolling members collide repeatedly with the inner peripheral surface of the direction changing passage. In order to prevent the rolling members from irregularly circulating due to the collision, it is necessary to form uniform play passage. According to the structure of the direction changing passage of the present invention, this can be achieved.

Furthermore, the direction changing passage outer periphery guide portion of the end plate can be exactly positioned with respect to the movable member main body along the rolling direction changing passage inner periphery guide portion of the end surface forming portion of the movable member main body. Accordingly, there can be accurately achieved the positional alignment of both the end portions of the direction changing passage outer periphery guide portion with the rolling member rolling passage on the guide shaft side and with the end portion of the rolling member return passage.

Further, in the direction changing passage, although noise will be likely generated due to the mutual collision of the rolling members, such noise can be substantially eliminated by forming the rolling direction changing passage through the welding process.

Furthermore, the apparatus is formed with the return hole constituting member as the axial forming portion and the ball retainer member, and accordingly, the end surface forming portion of the movable member main body can be further firmly fixed to the end surface of the movable member main body due to the axial contraction of these portions, so that the positional accuracy of the direction changing passage inner periphery guide portion can be enhanced at the welding time of the end plate.

The most high positional accuracy is required for both the end portions of the direction changing passage inner periphery guide portion which are to be connected to the non-loaded ball returning hole and the ball retainer member. The position of the direction changing passage inner periphery guide portion can be accurately determined by providing the return hole constituting member as the axial forming portion and the ball retainer member through which the axial contraction force is applied to both the end portions of the direction changing passage inner periphery guide portion. Accordingly, both the end portions of the direction changing passage outer periphery guide portion of the end plate which is welded along such direction changing passage inner periphery guide portion can be also accurately positioned.

The welded portion is formed continuously along the entire length between the joining surfaces at the peripheral portions of the rolling direction changing passage inner periphery guide portion and the rolling direction changing passage outer periphery guide portion. Accordingly, the rolling direction changing passage outer periphery guide portion on the end plate side can be more precisely positioned with respect to the rolling direction changing passage inner periphery guide portion, so that the direction changing passage can be further accurately manufactured.

Furthermore, the portions between the joining surfaces at the peripheral portions of the direction changing passage inner periphery guide portion and the direction changing passage outer periphery guide portion can be substantially completely sealed, so that the leakage of the lubricant to be supplied to the direction changing passage can be substantially prevented and the noise suppressing function can also be enhanced.

Still furthermore, since the joining surfaces are formed respectively to the recessed portions of the end plate and the protruded portions which are to be faucet fitted to those recessed portions, the direction changing passage outer periphery guide portion of the end plate can be further accurately positioned with respect to the movable member main body. The fused resin is filled up in the gaps between the fitted surface portions of the protruded portions and the recessed portions as well as the portions of the joining surfaces mentioned above, thereby further increasing the fixing strength. The filling and fusing of the fused resin in the gap between the protruded portions and the recessed portions can further contribute the maintenance of the accurate performance. The welding performed from the faucet fitting portion to the direction changing passage peripheral portion can contributes to increase the welding strength and prevent the fused resin from entering into the direction changing passage and the lubricant groove.

Still furthermore, according to a further preferred example, the joining surfaces of the end surface forming portion of the movable member main body and the end plate are not directly welded, and the fitted portions of the projection and the hole are welded, so that although the continuous welding is not performed, and the end plate is firmly fixed at the peripheral portion of the direction changing passage inner periphery guide portion, whereby the direction changing passage outer periphery guide portion can be precisely fixed with respect to the direction changing passage inner periphery guide portion.

The nature and further characteristic features of the present invention will be made more clear from the following descriptions with reference to the accompanying drawings.

BRIEF DESCRIPTION OF THE DRAWINGS

In the accompanying drawings:

FIG. 1 represents a linear motion guide apparatus according to a first embodiment of the present invention, in which

FIG. 2 represents a movable block of the linear motion guide apparatus of FIG. 1, in which FIG. 3 represents a linear motion guide apparatus according to a second embodiment of the present invention, in which

DESCRIPTION OF THE PREFERRED EMBODIMENTS

The present invention will be described hereunder by way of preferred embodiments with reference to the accompanying drawings.

[First Embodiment]

FIGS. 1 and 2 represents the first embodiment of a linear motion guide apparatus as a rolling motion guide apparatus according to the present invention.

Referring to FIGS. 1 and 2, reference numeral 1 denotes an entire structure of the linear motion guide apparatus, which is provided with a guide (track) rail 2 as a guide shaft and a movable block 4 as a movable member mounted to the guide rail 2 to be movable through a number of balls 3 as rolling members.

The guide rail 2 is composed of a long member having a rectangular cross section, and the movable block 3 is guided at the lateral, left and right, side of the guide rail 2, through four ball rows, two rows at each lateral side, 3A, 3A, 3A, 3A. The left and right side surfaces of the guide rail 2 is formed each with two, totally four, loaded ball rolling grooves 5, 5, 5, 5 as loaded rolling member rolling passage corresponding in positions to the four ball rows 3A, 3A, 3A, 3A, respectively, along the entire longitudinal length of the guide rail 2.

The movable block 3 is composed of a movable block body 6 as the main body of the movable member and rolling direction changing passage constituting members 10, 10 disposed to both end sides of the movable block body 6. The movable block body 6 is a member having a ]-shaped section an d is provided with a horizontal portion 61 opposing to the upper surface of the guide rail 2 and a pair of support leg (skirt) portions 62, 62 corresponding in positions to the left and right side surfaces of the guide rail 2. Furthermore, two loaded ball rolling grooves 8, 8, as loaded rolling member rolling passages, are formed respectively to the inner side surfaces of the paired left and right support leg portions 62, 62 of the movable block body 6, and the loaded ball rolling grooves 8, 8, 8, 8 correspond in position to the loaded ball rolling grooves 5, 5, 5, 5, respectively, formed to the left and right side surfaces of the guide rail 2. Furthermore, the support leg portions 62, 62 are also formed with ball returning passages 7, 7, 7, 7 as the rolling member returning passages for returning the balls from one end of each loaded ball rolling groove 8 to another end thereof.

The each rolling direction changing passage constituting member 10 is composed of an end surface forming portion 11 made of resin and an end plate 12 also made of resin. The end surface forming portion 11 is formed with an inner periphery guide portion of the rolling member direction changing passages (herein called merely direction changing passage inner periphery guide portion) 9a, 9a, 9a, 9a integrally formed with the movable block body 6 through an insertion molding process in which the movable block body 6 is inserted into a formation mold to carry out the molding. The end plate 12 is formed with an outer periphery guide portion of the rolling member direction changing passages (herein merely called direction changing passage outer periphery guide portion) 9b, 9b, 9b, 9b independently formed from the end surface forming portion 11. Joining surfaces of the peripheral portions of the direction changing passage inner periphery guide portion 11 and the direction changing passage outer periphery guide portion 12 are welded to thereby constitute a direction changing passage 9 having a curved U-shape.

The movable block body 6 is formed integrally with an axial forming portion, which is composed of a return hole constituting members 13 forming a non-loaded ball return holes 7 and connected to the end surface forming portions 11 at both the ends of the movable block body 6 and ball retainer members 14 preventing the balls 3 from falling down at the time when the guide rail 2 is withdrawn from the movable block body 6.

Each of the end surface forming portions 11 is composed of first protruded portions 111, each having substantially rectangular shape, formed to the end surfaces of the left and right leg (skirt) portions 62, 62 of the movable block body 6 and second protruded portions 112 formed to the end surface of the horizontal portion 61 so as to connect the right and left first protruded portions 111 to each other. Each of the left and right first protruded portions 111 is formed with upper and lower rows of the direction changing passage inner periphery guide portions 9a, 9a, 9a, 9a projecting in half-moon shape.

The end plate 12 has left and right skirt (leg) portions, to which first recessed portions 121 into which the first protruded portions 111 of the end surface forming portion 11 are fitted in a faucet manner, and second recessed portions 122 into which the second protruded portions are fitted in a faucet manner. These first and second protruded portions 111 and 112 of the end surface forming portion 11 constitute a staged protruded portion according to the structure of the present invention.

The first recessed portion 121 is formed with the direction changing passage outer periphery guide portions 9b, 9b; 9b, 9b which are circularly recessed in correspondence to the half-moon shaped direction changing passage inner periphery guide portion and constitutes the rolling direction changing passages 9, 9; 9, 9 in combination of the direction changing passage inner periphery guide portion 9a, 9a; 9a, 9a.

A second recessed portion 122, into which the second protruded portion 112 is fitted, is formed to the horizontal portion of each of the end plate 12, and the second recessed portion 122 has a bottom portion to which an oil groove 15 is formed so as to be communicate with the left and right direction changing passage outer periphery guide portion 9b, 9b; 9b, 9b from an oil supply port 123 opened at a central portion thereof. A grease nipple, not shown, is mounted to the oil supply port 123.

Joining surfaces 16a to 16e and 17a to 17e are formed between a peripheral portion of the direction changing passage inner periphery guide portion 9a of the left and right first protruded portions 111 of the movable block body 6 and a peripheral portion of the direction changing passage outer periphery guide portion 9b of the first recessed portions 121 of the end plate 12. These joining surfaces extend each with a predetermined width and are joined together, respectively. Joining surfaces 16f, 17g and 17f, 17g, which are joined together through the oil groove 15, are formed between the second protruded portions 112 and the first recessed portions 121 of the end plate 12. These joining surfaces 16f, 16g and 17f, 17g are formed with welding width portions 18 which are welded together in the fusing process. Although such welding width portions 18 may be formed either one of the joining surfaces 17a to 17g on the side of the end plate 12 and the joining surfaces 16a to 16g on the side of the first and second protruded portions 111 and 112 of the movable block body 6, in the present embodiment, the welding width portions 18 are formed on the side of the joining surfaces 17a to 17g of the first and second recessed portions 121 and 122 of the end plate 12.

Furthermore, the welding width portions 18 are formed continuously so as to surround the oil groove 15 as well as the bilateral direction changing passage outer periphery guide portions 9b of the end plate 12. The joining surfaces 17a, 17b and 17c, which are positioned at upper edge, outside edge and lower edge portions of the first recessed portion 121 of the end plate 12, are formed continuously so as to surround the two rows of upper and lower direction changing passage outer periphery guide portions 9b, 9b. The joining surface 17d constituting the boundary portion between the upper and lower direction changing passage outer periphery guide portion 9b and the joining surface 17e facing the end surface of the ball retainer portion 14 are formed at the intermediate portions therebetween.

The joining surface 17b of the outside edge portion of the first recessed portion 121 is formed to be flat, and the joining surfaces 17a and 17c of the upper and lower edge portions have partial flat portions at their outer end portions continuous to the outside edge portion and circular portions along the direction changing passage outer periphery guide portion 9b. The circular portions of the joining surfaces 17a and 17c may not be welded as occasion demands. Further, the joining surface 17d at the boundary portion between the upper and lower direction changing passage inner periphery guide portions 9b, 9b may not also be welded as occasion demands.

Furthermore, the joining surfaces 17e and 17f of the upper and lower edge portions of the second recessed portion 122 are continuously trimmed between the joining surfaces of the second protruded and recessed portions 112 and 122 surrounding the oil groove 15.

The joining surfaces 17a, 17b, 17c of the upper, outside and lower edge portions of the first recessed portion 121 and the welding width portions 18 trimming the joining surfaces 17f, 17g of the upper and lower edge portions of the second recessed portion 122 are formed respectively at the corner portions of the first and second recessed portions 121 and 122 to make maximum the thickness of the corner portions, the thickened portions being reduced in their thicknesses towards the direction changing passage 9 and the oil groove 15 so as to each provide a triangular shape in section and extend continuously with uniform width. Although, the welding width portions 18 may be formed to intermediate portions of the respective joining surfaces 17a, 17b, 17c, 17f, 17g, it will be desired to form them at portions apart by a predetermined distance from the rolling direction changing passage 9 or the oil groove 15 for preventing the fused resin material from entering into the rolling direction changing passage 9 or the oil groove 15.

In the described embodiment of the present invention, the direction changing passage inner periphery guide portion 9a of the end surface forming portion 11 integrally formed with the end surface of the movable block body 6 through the insertion molding process is accurately formed to the predetermined position of the movable block body 6 with the predetermined shape. In the formation mold, the movable block body 6 is positioned by a support portion contacting the loaded ball rolling grooves 8, 8, 8, 8, and the direction changing passage inner periphery guide portions 9a, 9a, 9a, 9a are accurately positioned with reference to the loaded ball rolling grooves 8, 8, 8, 8, and after the positioning, the molding process is carried out.

In the described embodiment, the peripheral portions of the direction changing passage inner periphery guide portion 9a and the direction changing passage outer periphery guide portion 9b of the end plate 12 and the movable block body 6 are fused and welded. Accordingly, even if the end plate is deformed as shown in FIGS. 2F to 2I in an exaggerative manner, the direction changing passage outer periphery guide portion 9b is fixed with the corrected deformation along the direction changing passage inner periphery guide portion 9a of the end surface forming portion 11 of the movable block body 6 molded with high performance, thereby forming the the passage constituting the rolling direction changing passage 9 with high accuracy. That is, in the rolling direction changing passage 9, the respective balls 3 are changed in their rolling directions with pushing force being applied to each other and the balls 3 collide repeatedly with the inner peripheral surface of the direction changing passage 9. In order to prevent the balls 3 from irregularly circulating due to the collision, it is necessary to form uniform play passage. According to the present invention, this can be achieved.

Furthermore, according to the embodiment of the present invention, the direction changing passage outer periphery guide portion 9b of the end plate 12 can be exactly positioned with respect to the movable block body 6 along the direction changing passage inner periphery guide portion 9a of the end surface forming portion 11 of the movable block body 6. Accordingly, there can be accurately achieved the positional alignment of both the end portions of the direction changing passage outer periphery guide portion 9b with the loaded ball rolling groove 5 on the guide rail side and with the end portion of the rolling ball return passage 7.

Further, in the direction changing passage 9, although noise will be likely generated due to the mutual collision of the rolling balls 3, such noise can be substantially eliminated by forming the direction. changing passage through the welding process.

Furthermore, in the present embodiment, the apparatus is formed with the return hole constituting member 13 as the axial forming portion and the ball retainer portion 14, and accordingly, the end surface forming portion 11 of the movable block body 6 can be further firmly fixed to the end surface of the movable block body 6 due to the axial contraction of these portions 13 and 14, so that the positional accuracy of the direction changing passage inner periphery guide portion 9a at the welding time of the end plate 12.

The most high positional accuracy is required for both the end portions of the direction changing passage inner periphery guide portion 9a which are to be connected to the non-loaded ball returning hole 7 and the ball retainer portion 14. The position of the direction changing passage inner periphery guide portion 9a can be accurately determined by providing the return hole constituting member 13 as the axial forming portion and the ball retainer portion 14 through which the axial contraction force is applied to both the end portions of the direction changing passage inner periphery guide portion 9a. Accordingly, both the end portions of the direction changing passage outer periphery guide portion 9b of the end plate 12 which is welded along such direction changing passage inner periphery guide portion 9b can be also accurately positioned.

The welded portion 19 is formed continuously along the entire length portions between the joining surfaces 16a to 16g and 17a to 17g at the peripheral portions of the direction changing passage inner periphery guide portion 9a, the direction changing passage outer periphery guide portion 9b and the oil groove 15. Accordingly, the direction changing passage outer periphery guide portion 9b on the end plate side can be more precisely positioned with respect to the direction changing passage inner periphery guide portion 9a, so that the rolling direction changing passage 9 can be further accurately manufactured.

Furthermore, the portions between the joining surfaces 16a to 16g and 17a to 17g at the peripheral portions of the direction changing passage inner periphery guide portion 9a, the direction changing passage outer periphery guide portion 9b and the oil groove 15 can be substantially completely sealed, so that the leakage of the oil to be supplied to the rolling direction changing passage 9 can be completely prevented and the noise suppressing function can also be enhanced.

Particularly, since the joining surfaces 16a, 16b, 16c, 16f, 16g and 17a, 17b, 17c, 17f, 17g are formed respectively to the first and second recessed portions 121, 122 of the end plate 12 and the first and second protruded portions 111, 112 which are to be faucet fitted to those recessed portions, the direction changing passage outer periphery guide portion 9b of the end plate 12 can be further accurately positioned with respect to the movable block body 6.

Still furthermore, the fused resin (welding portion) is filled up in the gaps 19 between the fitted surface portions of the first and second protruded portions 111, 112 and the first and second recessed portions 121, 122 as well as the portions of the joining surfaces mentioned above, thereby further increasing the fixing strength. The filling and welding of the fused resin in the gaps 19 between the first and second protruded portions 111, 112 and the first and second recessed portions 121, 122 can further contribute the maintenance of the accurate performance.

The welding process of the rolling motion guide apparatus of the structure mentioned above will be performed in the following manner.

Figure 1A:
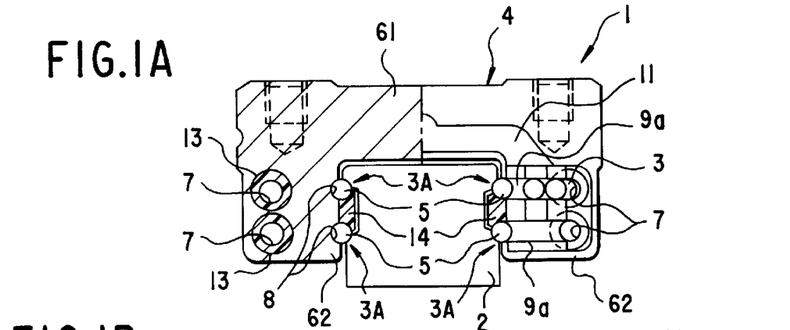
FIG. 1A is a front view, left half being in section, of the apparatus from which an end plate is removed.
Figure 1B:
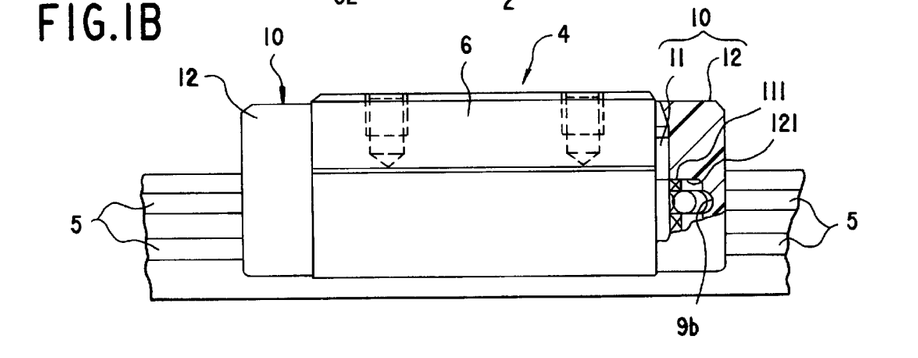
FIG. 1B is a side view thereof partially cut away.
Figure 1C:
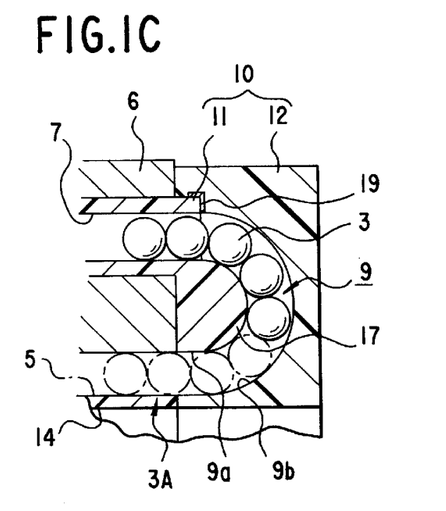
FIG. 1C is a sectional view in an enlarged scale of a portion of a rolling direction changing passage of the apparatus.
Figure 1D:
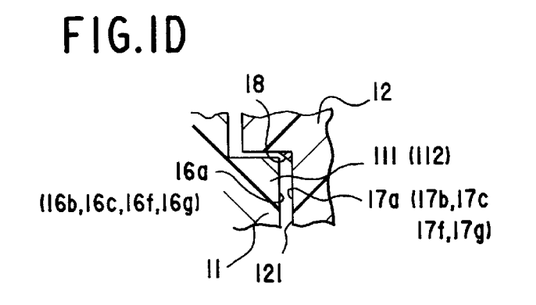
FIGS. 1D and 1E are schematic views showing welding sequence applied to the apparatus.
Figure 1E:
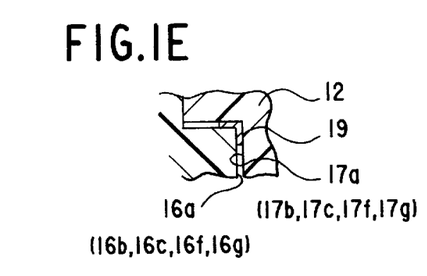
Figure 2A:
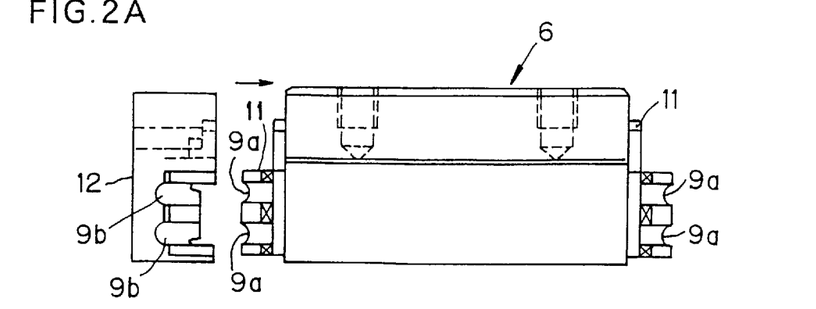
FIG. 2A is a disassembled side view of the apparatus having end plate shown in section.
Figure 2B:
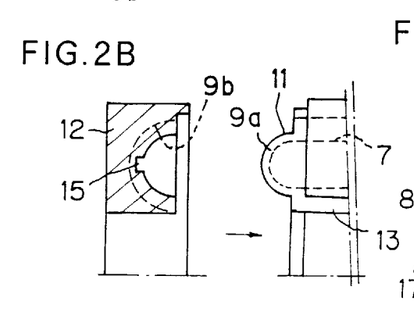
FIG. 2B is a partial bottom view of the end plate and an end surface portion of the movable block body in a disassembled state.
Figure 2C:
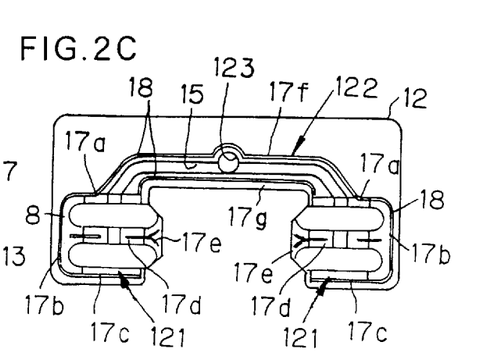
FIG. 2C is a view showing an end surface of the end plate to be joined to the end surface of the movable block body.
Figures 2D, 2E, 2F, 2G:
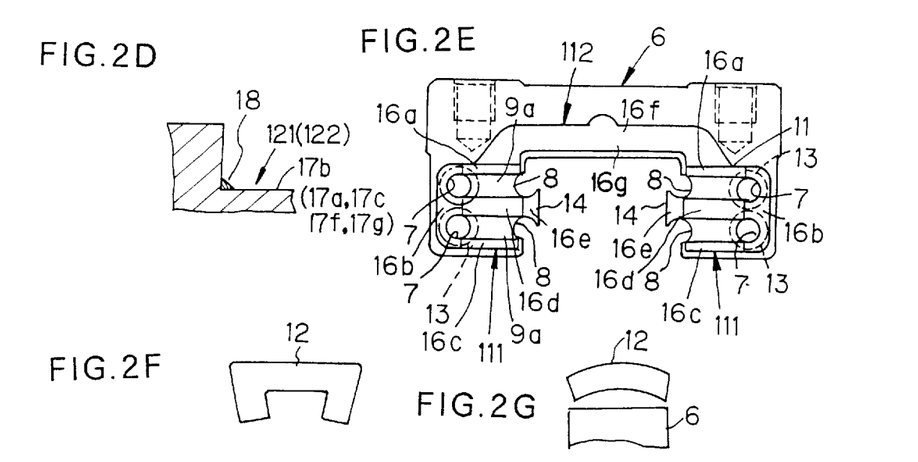
FIG. 2D shows a welding overlap width portion.
FIG. 2E shows an end surface of the movable block body.
FIGS. 2F to 2I show deformed states (strains) of the end plate in an exaggerated manner.
Figure 2H:
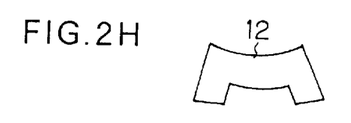
Figure 2I:
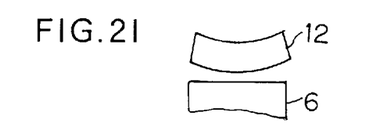

At the first step, the end plates 12 are mounted to both the ends of the movable block body 6 in a manner that the first and second protruded portions 111, 112 of the end surface forming portions 11 of the movable block body 6 are faucet fitting to the first and second recessed portions 121, 122 of the end plates 12, respectively.

In the next step, the movable block body 6 is supported by an ultrasonic plastic welder, not shown, while the back surface, to which the welding width portion 18 of the end plate 12 is formed, is uniformly pressed by a honing head, not shown, so that corner portions of the first and second protruded portions of the end surface forming portion 11 of the movable block body 6 abut against the welding width portion 18. Under the state, ultrasonic vibration is applied to thereby fuse and weld the welding width portions by friction force caused between the joining surfaces of the welding width portions 18 and the corner portions of the first and second protruded portions 111, 112.

At the initial stage of the welding, the most front end portion of the corner portion of the welding width portion 18 is first fused and, in an intermediate stage thereof, fused resin flows into the gap between the fitting portions of the first and second protruded portions 111, 112 and the first and second recessed portions 121, 122 and the joining surfaces 16a to 16g and 17a to 17g therebetween. In the final stage, the fusing at the welding width portion 18 has been completed by the pressing of the welder, and the joining surfaces 16a to 16g and 17a to 17g of the first and second protruded portions 111, 112 and the first and second recessed portions 121, 122 are contacted respectively and subjected to the pressing vibration. Thereafter, the fused resin is solidified, thus completing the welding process.

FIG. 3 represents a second embodiment of a linear motion guide apparatus as a rolling motion guide apparatus of the present invention.

Referring to FIG. 3, reference numeral 21 denotes an entire structure of a linear motion guide apparatus 21 which is essentially composed of a guide rail 22 as a guide shaft and a movable block 24 as a movable member which is mounted to the guide rail 22 through a number of balls 23 as rolling members.

The guide (track) rail 22 of this embodiment is composed of a long member having a rectangular cross section, and the movable block 24 is guided at the lateral, left and right, side of the guide rail 2, through two ball rows, one row at each lateral side, 23A, 23A. The left and right side surfaces of the guide rail 22 are formed with two loaded ball rolling grooves 25, 25 as loaded rolling member rolling passage corresponding in position to the two ball rows 23A, 23A, respectively, along the entire longitudinal length of the guide rail 22.

The movable block 24 is composed of a movable block body 26 as the main body of the movable member and rolling direction changing passage constituting members 30 disposed to both end sides of the movable block body 26. The movable block body 26 is a block member having a ]-shaped section and is provided with a horizontal portion 261 opposing to the upper surface of the guide rail 22 and a pair of support leg (skirt) portions 262, 262 corresponding in positions, i.e. opposing, to the left and right side surfaces of the guide rail 22. Furthermore, loaded ball rolling grooves 28, 28, as loaded rolling member rolling passages, are formed respectively to the inner side surfaces of the paired left and right support leg portions 262, 262 of the movable block body 26, the loaded ball rolling grooves 28, 28 corresponding in position to the loaded ball rolling grooves 25, 25, respectively, formed to the left and right side surfaces of the guide rail 22. Furthermore, the support leg portions 262, 262 are also formed with ball returning passages 27, 27 as the rolling member returning passages for returning the balls from one end of each loaded ball rolling groove 8 to another end thereof. Each of the respective balls 23 of the ball row 23A has a diameter larger than a diameter of the loaded ball rolling groove 25 to thereby apply a preload to the balls 23.

The rolling direction changing passage constituting member 30 is composed of an end surface forming portion 31 made of resin and an end plate 32 also made of resin. The end surface forming portion 31 is formed with a direction changing passage inner periphery guide portion 29a, 29a integrally formed with the movable block body 26 through an insertion molding process in which the movable block body 26 is inserted into a formation mold to carry out the molding. The end plate 32 is formed with a direction changing passage outer periphery guide portion 29b, 29b independently formed from the end surface forming portion 31. Peripheral portions of the direction changing passage inner periphery guide portion 29a of the movable block body 26 and the direction changing passage outer periphery guide portion 29b of the end plate 32 are welded to thereby constitute a rolling direction changing passage 29 having a curved U-shape.

The movable block body 26 is formed integrally with an axial forming portion, which is composed of a return hole constituting member 33 forming a non-loaded ball return hole 27 and connected to the end surface forming portions 31 at both the ends of the movable block body 26.

To the peripheral portions of the direction changing passage guide portion 29a of the end surface forming portion 31 of the movable block body 26 and the direction changing passage outer periphery guide portion 29b of the end plate 32, there are formed a recessed portion 36 and a protruded portion 37 which is faucet fitted to the recessed portion 36.

Figure 3A:
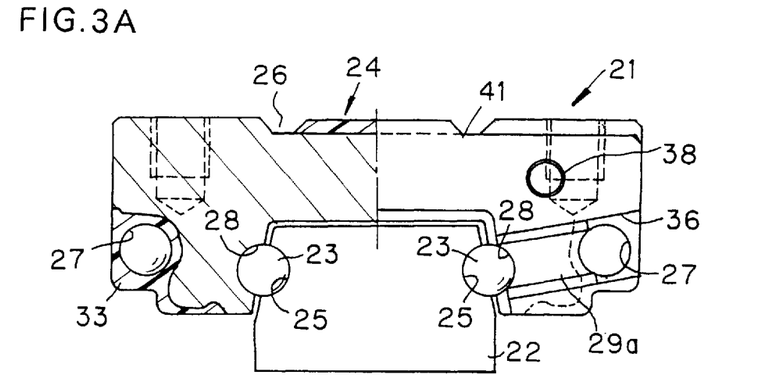
FIG. 3A is a front view, left half being in section, of the apparatus from which an end plate is removed.
Figure 3B:
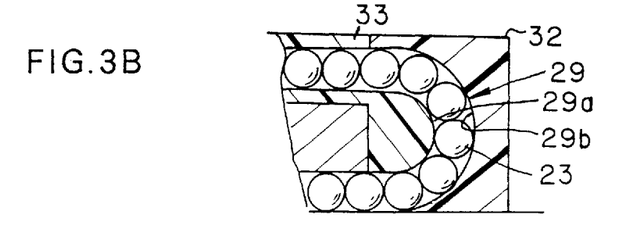
FIG. 3B is a partial sectional view in an enlarged scale of a portion of a rolling direction changing passage of the apparatus.
Figure 3C:
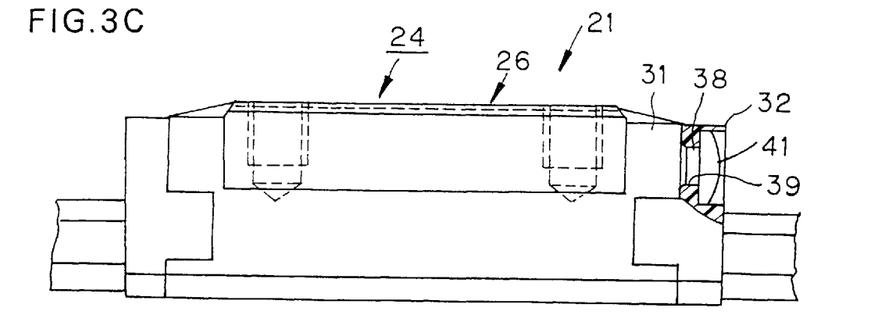
FIG. 3C is a side view of the apparatus partially cut away.
Figures 3D, 3E:
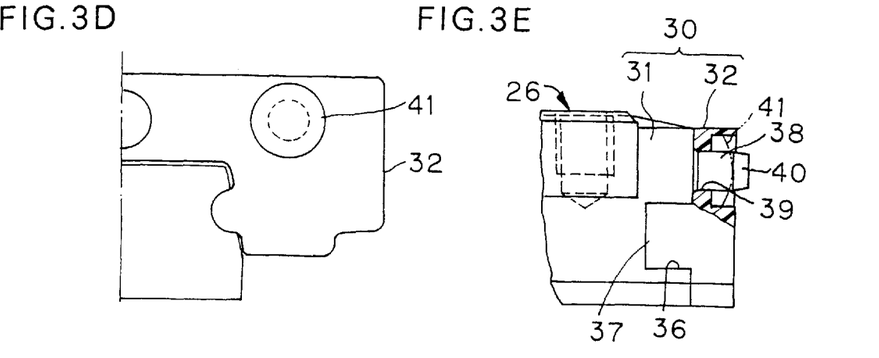
FIG. 3D is a half front view showing a state that the end plate is assembled.
FIG. 3E is a view showing a state of engagement of a projection of the movable block body with an engaging hole of the end plate before welding.

In the structure of the second embodiment, a projection 38 is formed to the joining surface at the peripheral portion of the direction changing passage 29 of the end surface forming portion 31 of the movable block body 26, and the end plate 32 is formed at its joining surface with a hole 39 through which the projection 38 is inserted. The front end portion 40 of the projection 38 extending over the hole 38 is fused to thereby form an engaging portion 41 which is engageable with the peripheral edge portion of the hole 39.

According to such structure, the joining surfaces of the end surface forming portion 31 of the movable member 26 and the end plate 32 are not directly welded and the fitted portions of the projection 38 and the hole 39 are welded. Accordingly, although the continuous welding is not carried out, the end plate 32 is firmly fixed at the peripheral portion of the direction changing passage inner periphery guide portion 29a, so that the direction changing passage outer periphery guide portion 29b can be precisely fixed with respect to the direction changing passage inner periphery guide portion 29a.

The welding process in this second embodiment will be performed in the following manner.

First, the front end portion 41 of the projection 38 of the movable block body 26 is pressed and crushed by a jig, not shown, under the application of the ultrasonic vibration to form the engaging portion 41 having a bevel shape having a diameter larger than that of the hole 39.

In the initial stage of the welding, the projection 38 is fused first at its front end portion, and in the intermediate stage, a shank portion 38a of the projection 38 inserted into the hole 39 is swelled by the compressing force, whereby a gap between the shank portion 38a and the inner peripheral surface of the hole 39 vanishes.

In the final stage of the welding, the engaging portion 41 of the front end portion of the projection 38 is pressed by a plastic welder, not shown, to thereby provide a semi-circular shape such as head portion of a rivet, and the end plate 32 is fixed to the movable block body 26 upon the completion of the pressing and vibrating processes.

Through the processes mentioned above, the positional performance between the direction changing passage inner periphery guide portion 29a and outer periphery guide portion 29b can be ensured, the balls 23 are fitted into the direction changing passage 29 while maintaining a suitable gap therebetween, and hence, the balls 23 can be smoothly circulated.

Furthermore, the positional precision of the direction changing passage inner periphery guide portion 29a formed to the end surface of the movable block body 26 can be ensured by forming the movable block body 26 through the insertion molding process. That is, since the direction changing passage inner periphery guide portion 29a of the movable block body 26 having high rigidity and the peripheral portion thereof are further tightly fixed through the axial contraction of the non-loaded rolling member return hole 27, the precision of the direction changing passage inner periphery guide portion 29a of the movable block body 26 can be ensured.

According to the present embodiment, since the positioning projection 38 is fused and then fixed at the peripheral portion of the direction changing passage 29, the direction changing passage outer periphery guide portion 29a of the end plate 23 can be also fixed in accordance with the direction changing passage inner periphery guide portion 29b of the movable block body 26 formed precisely, and accordingly, the rolling direction changing passage 29 can be formed with high precision and performance.

It is further to be noted that the present invention is not limited to the embodiments described above and many other changes or modifications may be made without departing from the scope of the appended claims. For example, in the embodiments mentioned above, either one of the end plate and the end surface forming portion may be formed of a thermoplastic resin. Although it is described above that the plastic welding (fusing) process is performed by using ultrasonic welding method, the present invention is not limited thereto and a heat welding process may be applicable, and a laser welding process or other welding processes may be also applicable.

What is claimed is:

1. A rolling motion guide apparatus comprising:

a guide shaft formed with a loaded rolling member rolling passage; and a movable member disposed to be movable with respect to the guide shaft through a number of rolling members, said movable member being composed of a movable member main body provided with a loaded rolling member rolling passage corresponding in position to the loaded rolling member rolling passage formed to the guide shaft and a rolling member returning passage for returning the rolling members from one end of the loaded rolling member rolling passage of the movable member main body to another end thereof and a pair of rolling direction changing passage structures respectively constituting a rolling member direction changing passage for guiding the rolling member scooped from the loaded rolling member rolling passage of the movable member main body to the rolling member returning passage, wherein said each rolling direction changing passage structure is composed of an end surface forming portion which is formed with a rolling direction changing passage inner periphery guide portion integrally formed with the movable member main body and an end plate which is formed with a rolling direction changing passage outer periphery guide portion separately formed from the end surface forming portion, and wherein the rolling direction changing passage outer periphery guide portion of the end plate and a rolling direction changing passage inner periphery guide portion thereof have peripheral portions respectively which are joined and welded.

2. A rolling motion guide apparatus according to claim 1, the peripheral portions respectively is provided with the joining surfaces as a welding portion.

3. A rolling motion guide apparatus according to claim 1, wherein the end surface forming portion of the movable member main body is formed of a resin material through an insertion molding process.

4. A rolling motion guide apparatus according to claim 1, wherein said guide shaft is a guide rail and said movable member is composed of a central horizontal portion and side portions extending downward in a mounted state from both end portions of the horizontal portion, said guide rail being disposed between the side portions of the movable member.

5. A rolling motion guide apparatus according to claim 1, wherein the movable member main body is provided with axial forming portions which are integrally formed with the end surface forming portions formed at both ends of the movable member main body.

6. A rolling motion guide apparatus according to claim 5, wherein each of said axial forming portion is provided with at least either one of a return hole constituting member forming a non-loaded rolling member returning hole and a rolling member retainer member for preventing the rolling member from falling down at a time when the guide shaft is withdrawn from the movable member.

7. A rolling motion guide apparatus according to claim 1, wherein the rolling direction changing passage outer periphery guide portion and the rolling direction changing passage inner periphery guide portion of the rolling direction changing passage structure have peripheral portions respectively which are joined so as to provide joining surfaces, and a welding portion is continuously formed between the joining surfaces.

8. A rolling motion guide apparatus according to claim 1, wherein a lubricant groove is formed between joining surfaces of the end surface forming portion and the end plate to communicate with the rolling direction changing passage structure and the welding portion is formed continuously so as to surround the rolling direction changing passage structure and the lubricant groove.

9. A rolling motion guide apparatus according to claim 1, wherein a recessed portion and a protruded portion which is faucet fitted to the recessed portion are formed to peripheral portions of the rolling direction changing passage inner periphery guide portion of the end surface forming portion of the movable member main body and the rolling direction changing passage outer periphery guide portion of the end plate, said protruded and recessed portions having flat portions as joining surfaces to be joined together and a welding width portion, which is fused at a welding time, is formed between the joining surfaces.

10. A rolling motion guide apparatus according to claim 1, wherein a projection is formed to the joining surface of the end surface forming portion of the movable member main body and the end plate is formed with a hole at the joining surface thereof through which the projection is inserted and a front end portion of the projection penetrating over the hole is fused and welded to a peripheral edge portion of the hole.

* * * * *